United States Patent [19]

Hijikata et al.

[11] Patent Number: 4,767,680
[45] Date of Patent: Aug. 30, 1988

[54] FUEL CELL

[75] Inventors: Akemi Hijikata; Masaaki Matsumoto; Taesuke Nakayama; Yasuyuki Hamazaki; Kenji Kataoka, all of Kobe, Japan

[73] Assignee: Mitsubishi Denki Kabushiki Kaisha, Japan

[21] Appl. No.: 72,756

[22] Filed: Jul. 13, 1987

[30] Foreign Application Priority Data

| Jul. 16, 1986 | [JP] | Japan | 61-168725 |
|---|---|---|---|
| Jul. 16, 1986 | [JP] | Japan | 61-168726 |
| Jul. 16, 1986 | [JP] | Japan | 61-168728 |
| Jul. 28, 1986 | [JP] | Japan | 61-178120 |
| Jul. 28, 1986 | [JP] | Japan | 61-178121 |
| Jul. 28, 1986 | [JP] | Japan | 61-178122 |
| Aug. 4, 1986 | [JP] | Japan | 61-183841 |

[51] Int. Cl.$^4$ .................................. H01M 8/04
[52] U.S. Cl. ........................... 429/39; 429/41; 429/44
[58] Field of Search .................. 429/34, 38, 39, 40, 429/41, 44

[56] References Cited

U.S. PATENT DOCUMENTS

| 4,374,906 | 2/1983 | Breault et al. | 429/44 |
| 4,461,813 | 7/1984 | Shirogami et al. | 429/39 X |
| 4,647,516 | 3/1987 | Matsumura et al. | 429/19 |
| 4,652,502 | 3/1987 | Breault et al. | 429/44 X |
| 4,686,072 | 8/1987 | Fukuda et al. | 429/44 X |

Primary Examiner—Anthony Skapars
Attorney, Agent, or Firm—Leydig, Voit & Mayer

[57] ABSTRACT

A fuel cell comprises a gas separator having a dense layer, with porous portions disposed on both faces of the dense layer. The fuel cell, therefore, can store excess electrolyte, and absorb volume changes in the electrolyte without accompanying "flooding". Further, the fuel cell can reduce the thickness of a unit cell, and improve the space factor to output of the fuel cell.

21 Claims, 7 Drawing Sheets

FUEL CELL

BACKGROUND OF THE INVENTION

This invention relates to a fuel cell and more particularly, to a cell structure of a fuel cell stack.

FIG. 1 is a partial cross-sectional view illustrating a typical cell structure of a fuel cell which is disclosed, for example, in Japanese Patent Publication No. 59-152, Japanese Patent Laid-Open No. 59-66067, and Japanese Patent Laid-Open No. 58-68881. In this figure, catalyst layers 2 and 3 are disposed on both faces of an electrolyte matrix 1, electrode substrates 4 and 5 being disposed on the backs of catalyst layers 2 and 3, respectively. These catalyst layers 2 and 3 and substrates 4 and 5 make up fuel side and oxidant side electrodes 6 and 7, respectively. The substrates 4 and 5 are made of a porous material such as carbon fibers. Gas separators 10 (also called interconnectors) made of materials such as impermeable dense carbon plate are disposed on the back sides of the substrates 4 and 5. On the portions of the gas separators 10 adjacent to the substrates 4 and 5, gas channels 11 and 12 are provided for fuel and oxidant gases, these channels crossing each other orthogonally. Fuel and oxidant gases are supplied to the gas channels 11 and 12 and then reach the whole area of the substrates 4 and 5, where the gases are diffused to reach the catalyst layers 2 and 3. Then, the fuel and oxidant gases at the catalyst layers 2 and 3 react with each other and generate power through the electrolyte matrix 1. At this time, non-reacted excess gases and water vapor which is a reaction product are exhausted to the exterior of the fuel cell through the gas channels 11 and 12. Moreover, the exhausted gas will contain an electrolyte which is included in the matrix 1 and electrodes 6 and 7 in a vapor state determined by the operating conditions of the fuel cell.

At both faces of both ends of the matrix 1 (only one end being shown) wet gas seals 8 and 9 are disposed to be adjacent to the end surfaces of the substrates 4 and 5, respectively. These wet gas seals 8 and 9 are for preventing the fuel and oxidant gases in the gas channels 11 and 12 from leaking through the porous substrates 4 and 5 to the outside of the fuel cell.

The conventional fuel cell is constructed as described-above, and therefore, the electrolyte is only held in the matrix 1, catalyst layers 2 and 3, and wet gas seals 8 and 9. When the fuel cell is operated for long periods of time, a shortage of the electrolyte is caused by evaporation or dispersion thereof, whereby only electrolyte impregnated and held in the wet gas seals 8 and 9 would be supplied to the matrix 1 and the catalyst layers 2 and 3. This results in that frequent replenishment of the electrolyte from the exterior of the fuel cell is required. Moreover, the volume of the electrolyte varies considerably according to the operating conditions of the fuel cell such as operation pressure, operation temperature, gas utilization ratio, and initial level of the electrolyte. However, conventional fuel cells do not have the ability to absorb such volume changes of the electrolyte. For example, when the cell size is large, even where an outer reservoir is connected to the fuel cell, the expanded portion of the electrolyte will overflow to the catalyst layers 2 and 3, substrates 4 and 5, or gas channels 11 and 12 before reaching the outer reservoir. Because the distance the electrolyte travels in the matrix 1 to the outer reservoir is long, "flooding" of the fuel cell will result, whereby performance of the fuel cell will be lowered.

The minimum thicknesses of each component of the conventional cell are as follows: gas separator 10 is 0.6–0.8 mm, electrode substrates 4 and 5 are 1.8–2.0 mm, fuel side electrode is 0.06–0.1 mm, air side electrode is 0.1–0.15 mm, and gas matrix 1 is 0.15–0.25 mm. Therefore the minimum thickness of the unit cell is 4.5–5.3 mm. Therefore, in piling a plurality of unit cells there arises the problem that the total size of the fuel cell become large and the space factor in relation to output of the fuel cell is poor.

SUMMARY OF THE INVENTION

Accordingly, an object of the present invention is to provide a fuel cell which can store excess electrolyte, can operate stably for long periods of time without replenishing the electrolyte, and can absorb volume changes of the electrolyte without accompanying "flooding".

Another object of the present invention is to provide a fuel cell which can decrease the thickness of the fuel cell and improve the space factor to output of the fuel cell.

In order to achieve the above object, according to one aspect of the present invention, there is provided a fuel cell which is fabricated by piling a plurality of fuel cell units, each unit comprising: an electrolyte matrix layer, a pair of electrode layers each made of a catalyst layer which sandwich both faces of the matrix layer, gas separators which are disposed adjacent to the outer faces of the electrode layers, each of the gas separators comprising a gas impermeable dense layer and porous portions which are disposed on both faces of the gas impermeable dense layer for storing an electrolyte.

According to another aspect of the present invention, there is provided a fuel cell which is fabricated by piling a plurality of fuel cell units, each unit comprising an electrolyte matrix layer, a pair of electrode layers which sandwich both faces of the matrix layer, gas separators which are disposed adjacent to the outer faces of the electrode layers, each of the gas separators comprising a gas impermeable dense layer, a porous portion which is disposed on one face of the gas impermeable dense layer for storing an electrolyte, and a dense portion which is disposed on the other face of the gas impermeable dense layer for preventing the fuel and oxidant gases from mixing, one of the electrode layers which is adjacent to the porous portion being composed of a catalyst layer, and the other electrode layer which is adjacent to the dense portion being composed of a catalyst layer and an electrode substrate.

BRIEF DESCRIPTION OF THE DRAWING

The present invention will become more readily apparent from the following detailed description of the preferred embodiment of the present invention when taken in conjunction with the accompanying drawings, in which.

PREFERRED EMBODIMENT OF THE INVENTION

Figure 1:
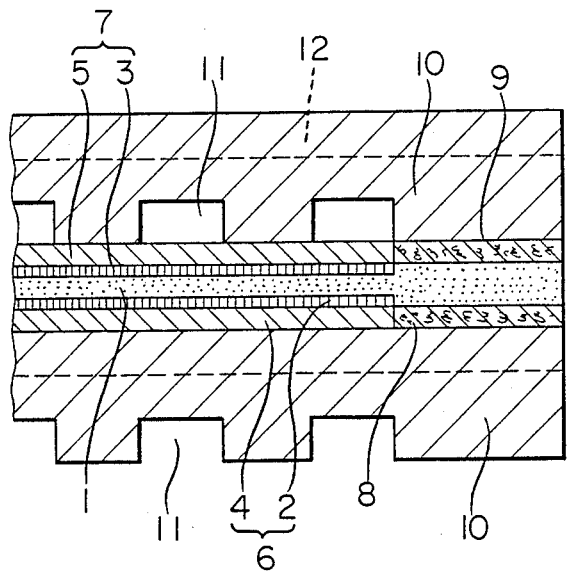
FIG. 1 is a partially sectional view showing a cell structure of a conventional fuel cell.
Figure 2:
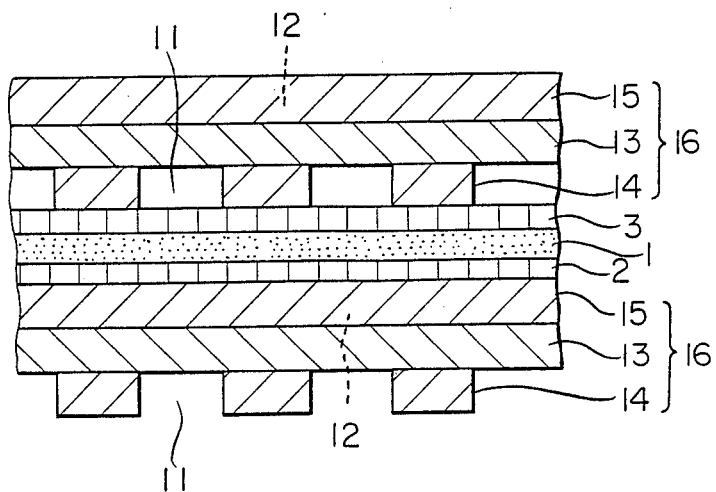
FIG. 2 is a partially sectional view showing a cell structure of a fuel cell in accordance with one embodiment of the present invention.

FIG. 2 is a partially sectional view showing a cell structure of a fuel cell in accordance with the present invention. In FIG. 2 and the following figures, the same reference numerals indicate the same or corresponding parts. In FIG. 2, catalyst layers 2 and 3 are disposed on both faces of an electrolyte matrix 1 in the same manner as shown in FIG. 1. In FIG. 2, electrode substrates which compose a part of an electrode in a conventional fuel cell are not used. Substrates, however, may be used as occasion demands. Gas separators 16 (also called composite ribbed separators) are disposed adjacent to the catalyst layers 2 and 3. Each of the gas separators 16 are composed of a gas impermeable dense layer 13 and porous portions 14 and 15 which are disposed on both faces of the dense layer 13 which are either unitarily fabricated as ribs with the dense layer 13 or fabricated separately from and joined as ribs to the dense layer 13. The porous portions 14 and 15 are made of a plurality of porous materials, and therefore, they can store an electrolyte. The porous portions 14 or 15 are disposed in parallel with each other at predetermined intervals at one face of the dense layer 13. On both faces of the gas separator 16 gas channels 11 and 12 are formed to cross each other at right angles. By means of the gas channels 11 and 12 fuel and oxidant gases are supplied from and exhausted to the exterior of the fuel cell. At this time, the dense layer 13 can prevent the fuel and oxidant gases which flow through the gas channels 11 and 12 from mixing. The fuel and oxidant gases from the gas channels 11 and 12 reach directly into the catalyst layers 2 and 3 or indirectly after diffusion into the porous portions 14 and 15. The gases reaching the catalyst layers 2 and 3 are ionized there and react with each other through the matrix 1 to generate electric power. In a fuel cell which is constructed by piling a plurality of cells, the generated power is taken out between the upper and lower ends. Non-reacted excess gases and water vapor which is a reaction product are exhausted out of the fuel cell. This exhausted gas contains electrolyte which is included in the matrix 1 and catalyst layers 2 and 3, therefore, the electrolyte is gradually exhausted out of the fuel cell. This results in the shortage of the electrolyte in the matrix 1 or the catalyst layers 2 and 3 when the fuel cell is operated for long periods of time. However, the impregnated electrolyte in at least one of the porous portions 14 and 15 transfers toward the matrix 1 and the catalyst layer 14 and 15 so as to relieve the shortage of the electrolyte, whereby stable operation of the fuel cell can be performed for long periods of time. The transfer of the electrolyte is carried out by capillary action, the suction force of which is determined by pore size and a wettability of each member to the electrolyte. Therefore, by controlling the pore side and the degree of wet-proofing treatment of, for example, porous portions 14 and 15, the suction force can be regulated so as to optionally determine the transfer rate or volume of the electrolyte.

Figure 3:
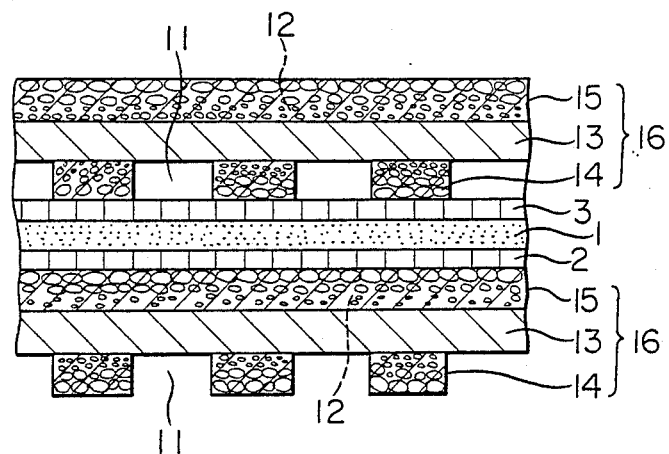
FIG. 3 is a partially sectional view showing a cell structure of a fuel cell in which a pore size distribution of porous portions disposed on both faces of a dense layer are different from each other in accordance with another embodiment of the present invention.

For this reason, the pore size of the porous portions 14 and 15 is larger than the maximum pore size of both the catalyst layers 2 and 3 and the electrolyte matrix 1. Moreover, the pore size distribution of the porous portions 14 and 15 may be different from each other, as illustrated by the different sized pores in the porous portions 14 and 15 in FIG. 3, and also predetermined pore size distributions may exist in the porous portions 14 or 15 themselves. In FIG. 3, since the pore size of the porous portions 14 and 15 disposed adjacent to the catalyst layers 2 and 3 are large, the electrolyte will first impregnate into the small pore sized portion. Therefore, the sides of the porous portions 14 and 15 adjacent to the catalyst layers 2 and 3 remain void, which ensures the gas diffusion of the fuel and oxidant gases. Accordingly, the fuel and oxidant gases supplied to the gas channels 11 and 12 can be introduced to the whole areas of the catalyst layers 2 and 3 through the porous portions 14 and 15, and an efficient cell reaction can take place.

On the other hand, a wet-proofed layer (not shown in figures) may be provided between the porous portions 14 and 15 and the dense layer 13 by a wet-proofing treatment for positively preventing the electrolyte stored in the porous portions 14 and 15 from transmitting to the dense layer 13.

Although the mechanism for replenishing the electrolyte shortage caused by evaporation or scattering of the electrolyte is described above, when using phosphoric acid for the electrolyte, mechanisms for absorbing variation in volume (expansion or contraction) of the electrolyte are required, such variations depending on the starting, stopping, or operating conditions (such as operation pressure, operation temperature, gas utilization ratio, initial level of electrolyte in the cell and the like) of the fuel cell. Even though the porous portions 14 and 15 are impregnated with the electrolyte, some void portions still remain. These void in the porous portions 14 and 15 can absorb the expanded electrolyte at the matrix 1 or catalyst layers 2 and 3 during the fuel cell operation. In the case of contraction of the electrolyte, the electrolyte stored in the porous portions 14 and 15 will be supplied to the portion requiring the electrolyte in a manner similar to the expansion.

Figure 4:
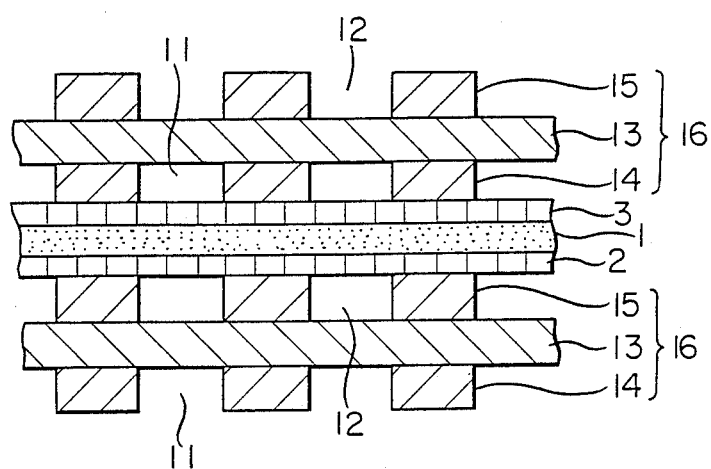
FIG. 4 is a partially sectional view showing a cell structure of a fuel cell in which porous portions are disposed at predetermined intervals on both faces of a dense layer in accordance with still another embodiment of the present invention.

In the above-mentioned embodiment, the porous portions 14 and 15 were described as being ribs, however, they need only be capable of supplying the fuel and oxidant gases evenly to the catalyst layers. The porous portions 14 and 15 may be disposed at predetermined intervals as to form the gas channels 11 and 12 parallel to each other as illustrated in FIG. 4.

Figure 5:
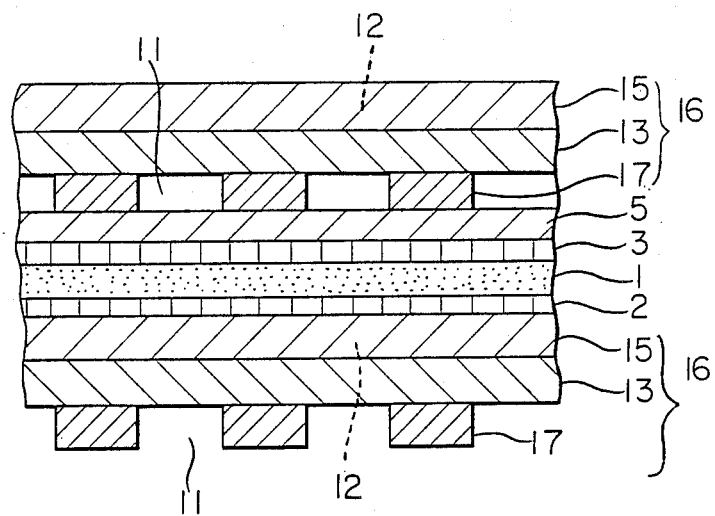
FIG. 5 is a partially sectional view showing a cell structure of a fuel cell in which a porous portion is disposed on one face of a dense layer and a dense portion is disposed on the other face of the dense layer in accordance with still another embodiment of the present invention.

FIG. 5 is a partially sectional view showing a cell structure of the fuel cell in accordance with another embodiment of the present invention. In this Figure, porous portions 15 and dense portions 17 are disposed on respective faces of a dense layer 13 to form gas channels 11 and 12, respectively. Gas separators 16 are composed of the dense layer 13, porous portions 15, and dense portions 17. Electrode layers adjacent to the dense portions 17 are composed of a substrate 5 and a catalyst layer 3. Fuel and oxidant gases can be diffused through the whole area of the catalyst layers 3 by using the substrate 5. On the other hand, electrode layers adjacent to the porous portions 15 do not require the substrate 5 and they may be composed of only a catalyst layer 3. In this case, generated electricity and heat are conducted efficiently by the conductive dense portions 17, whereby the efficiency of the fuel cell can be raised.

Figure 6:
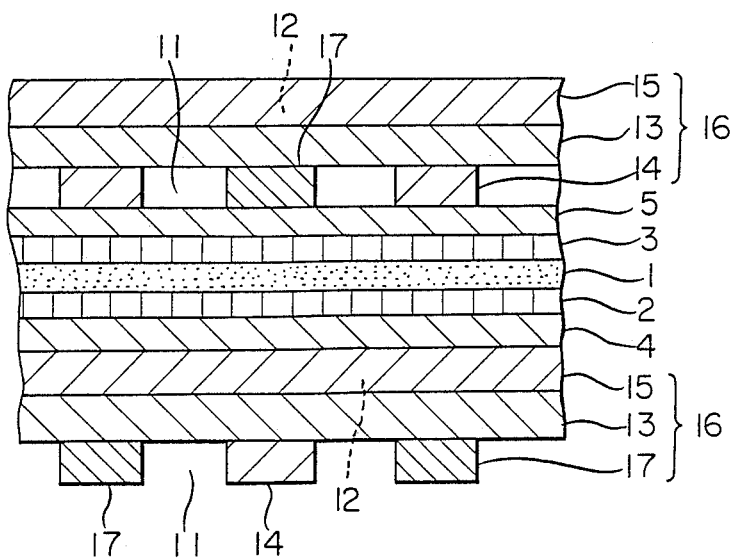
FIG. 6 is a partially sectional view showing a cell structure of a fuel cell in which a porous portion and dense portion are disposed alternatively on both faces of a dense layer in accordance with still another embodiment of the present invention.
Figure 7:
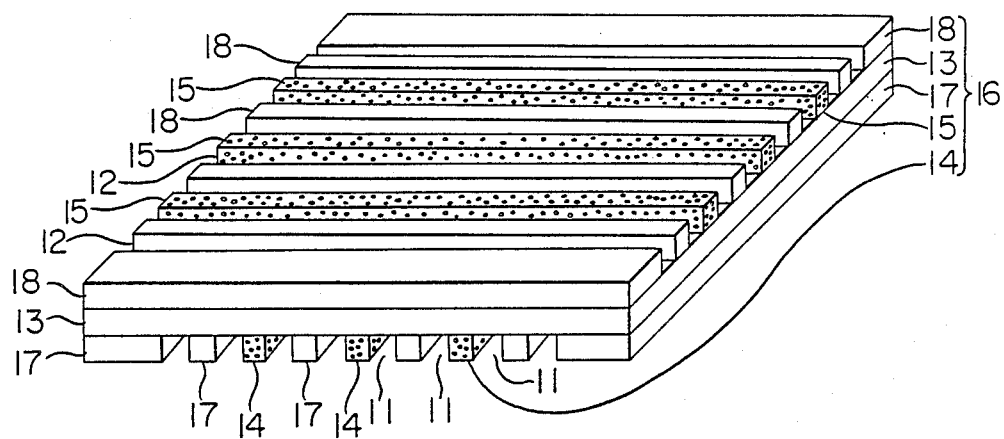
FIG. 7 is a perspective view of a cell structure of a fuel cell shown in FIG. 6.

FIG. 6 is a partially sectional view showing a cell structure of the fuel cell in accordance with still another embodiment of the present invention. FIG. 7 is a perspective view of a cell structure shown in FIG. 6. In these figures, porous portions 14 and 15 and dense portions 17 and 18 are disposed alternately on both surfaces of a dense layer 13 to form gas channels 11 and 12, respectively. Gas separators 16 are composed of the dense layer 13, porous portions 14 and 15, and dense portions 17 and 18. Electrode layers adjacent to both faces of the gas separator 16 are composed of catalyst layers 2 and 3 and substrates 4 and 5. In this case, the substrates 4 and 5 can diffuse the fuel and oxidant gases through the whole areas of the catalyst layers 2 and 3. The heat and electrical conductivity of dense portions 17 and 18 are higher than those of the porous portions 14 and 15, therefore, the dense portions 17 and 18 themselves become a pathway or the generated electricity and heat can prevent decreases in electricity and heat which are due to disposition of the ribbed porous portions 14 and 15.

Figure 8:
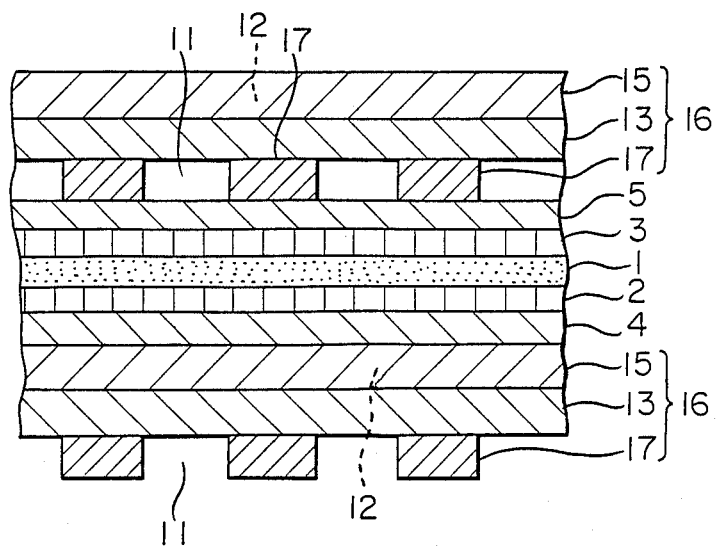
FIG. 8 is a partially sectional view showing a cell structure of a fuel cell in which a porous portion and a dense portion are disposed alternately on one face of a dense layer and a dense portion is disposed on the other face of the dense layer in accordance with still another embodiment of the present invention.

FIG. 8 is a partially sectional view showing a cell structure of the fuel cell in accordance with still another embodiment of the present invention. In this Figure, porous portions 15 and dense portions 18 (not shown) are disposed on one face of a dense layer 13 to form gas channels 12 and dense layers 17 are disposed on the other face of the dense layer 13 to form gas channels 11. Gas separators 16 are composed of the dense layers 13, porous portions 15, and dense portions 17 and 18. Electrode layers adjacent to both faces of the gas separator 16 are composed of catalyst layers 2 and 3 and substrates 4 and 5. In this case, the substrates 4 and 5 can diffuse the fuel and oxidant gases through the whole area of the catalyst layers 2 and 3.

As described-above, only porous portions need be disposed on at least one face of the dense layer 13. In this case, the electrodes disposed adjacent to the porous portions may be catalyst layers. Of course, the electrode substrate may be used for the electrode, because the fuel and oxidant gases can reach directly to the catalyst layers, or, after diffusing in the porous portions, reach to the catalyst layers. Therefore, the substrate can be omitted, and the thickness of the cell can be decreased. For example, the thickness of the dense layer can be 0.6–0.8 mm, porous portions 1–1.5 mm, the catalyst layers of the fuel side electrode 0.06–0.1 mm, the catalyst layers of the oxidant side electrode 0.1–0.25 mm, and the total thickness of the unit cell can be 2.9–4.3 mm. Thus, since the thickness of the cell can be decreased, a greater number of cells can be piled in the same height as in the conventional cells, whereby the space factor to output can be improved. Moreover, gas diffusion to the electrodes is performed directly without going through the substrate, so diffusion loss can be decreased, whereby characteristics of the fuel cell can be improved.

What is claimed is:

1. A fuel cell which is fabricated by piling a plurality of fuel cell units, each unit comprising:
   an electrolyte matrix layer;
   a pair of electrode layers each made of a catalyst layer, which sandwich both faces of said matrix layer;
   gas separators which are disposed adjacent to outer faces of said electrode layers, each of said gas separators comprising:
   a gas impermeable dense layer; and
   porous portions which are disposed on both faces of said dense layer for storing an electrolyte.

2. A fuel cell as claimed in claim 1 wherein gas channels are surrounded by said dense layer of each of said gas separators, said porous portions disposed on said dense layer, and said electrode layers adjacent to said porous portions, for supplying and exhausting a fuel gas or oxidant gas.

3. A fuel cell as claimed in claim 2 wherein said gas channels are provided to cross each other orthogonally.

4. A fuel cell as claimed in claim 1 wherein a wet-proofed layer is formed between said dense layer and said porous portions for preventing an electrolyte stored in said porous portions from flowing out.

5. A fuel cell as claimed in claim 1 wherein distributions of pore sizes of said porous portions disposed at both faces of each of said gas separators are different from each other.

6. A fuel cell as claimed in claim 1 wherein the pore size of said porous portions is larger than the maximum pore sizes of said electrodes and of said electrolyte matrix.

7. A fuel cell as claimed in claim 1 wherein said porous portions are unitarily fabricated with said dense layer.

8. A fuel cell as claimed in claim 1 wherein said porous portions are fabricated separately from and joined with said dense layer.

9. A fuel cell which is fabricated by piling a plurality of fuel cell units, each unit comprising:
   an electrolyte matrix layer;
   a pair of electrode layers which sandwich both faces of said matrix layer;
   gas separators which are disposed adjacent to outer faces of said electrode layers, each of said gas separators comprising:
   a gas impermeable dense layer;
   a porous portion which is disposed on one face of said dense layer for storing an electrolyte; and
   a dense portion which is disposed on the other face of said dense layer for preventing the fuel and oxidant gases from mixing, one of said electrode layers which is adjacent to said porous portion being composed of a catalyst layer, and the other electrode layer which is adjacent to said dense portion being composed of a catalyst layer and an electrode substrate.

10. A fuel cell as claimed in claim 9 wherein gas channels are surrounded by said dense layer of each of said gas separators, one of said porous portion and said dense portion, and said electrode layers, for supplying and exhausting a fuel gas or oxidant gas.

11. A fuel cell as claimed in claim 9 wherein said gas channels are provided to cross each other orthogonally.

12. A fuel cell as claimed in claim 9 wherein a wet-proofed layer is formed between said dense layer and said porous portion for preventing an electrolyte stored in said porous portion from flowing out.

13. A fuel cell as claimed in claim 9 wherein the pore size of said porous portions is larger than the maximum pore sizes of said electrodes and of said electrolyte matrix.

14. A fuel cell as claimed in claim 9 wherein said porous portion is unitarily fabricated with said dense layer.

15. A fuel cell as claimed in claim 9 wherein said porous portions are fabricated separately from and joined with said dense layer.

16. A fuel cell as claimed in claim 9 wherein each of said gas separators comprises: a gas impermeable dense layer; a porous portion and a first dense portion which are disposed alternately on one face of said dense layer; and a second dense portion which is disposed on the other face of said dense layer, each of said electrode layers being made of a catalyst layer and a electrode substrate.

17. A fuel cell as claimed in claim 16 wherein gas channels are surrounded by said dense layer of each of said gas separators, one of said porous portion and said first dense portion, and said electrode layers, for supplying and exhausting a fuel gas or oxidant gas.

18. A fuel cell as claimed in claim 17 wherein said gas channels are provided to cross each other orthogonally.

19. A fuel cell as claimed in claim 9 wherein each of said gas separators comprises: a gas impermeable dense layer; and a porous portion and a dense portion which are disposed alternately on both faces of said dense layer, each of said electrode layers being made of a catalyst layer and a electrode substrate.

20. A fuel cell as claimed in claim 19 wherein gas channels are surrounded by said dense layer of each of said gas separators, one of said porous portion and said dense portion, and said electrode layers, for supplying and exhausting a fuel gas or oxidant gas.

21. A fuel cell as claimed in claim 20 wherein said gas channels are provided to cross each other orthogonally.

* * * * *